Feb. 7, 1928.
S. LÖFFLER
FLUID LEVEL INDICATOR FOR HIGH PRESSURE VESSELS OR CONTAINERS
Filed July 10, 1925
1,658,449
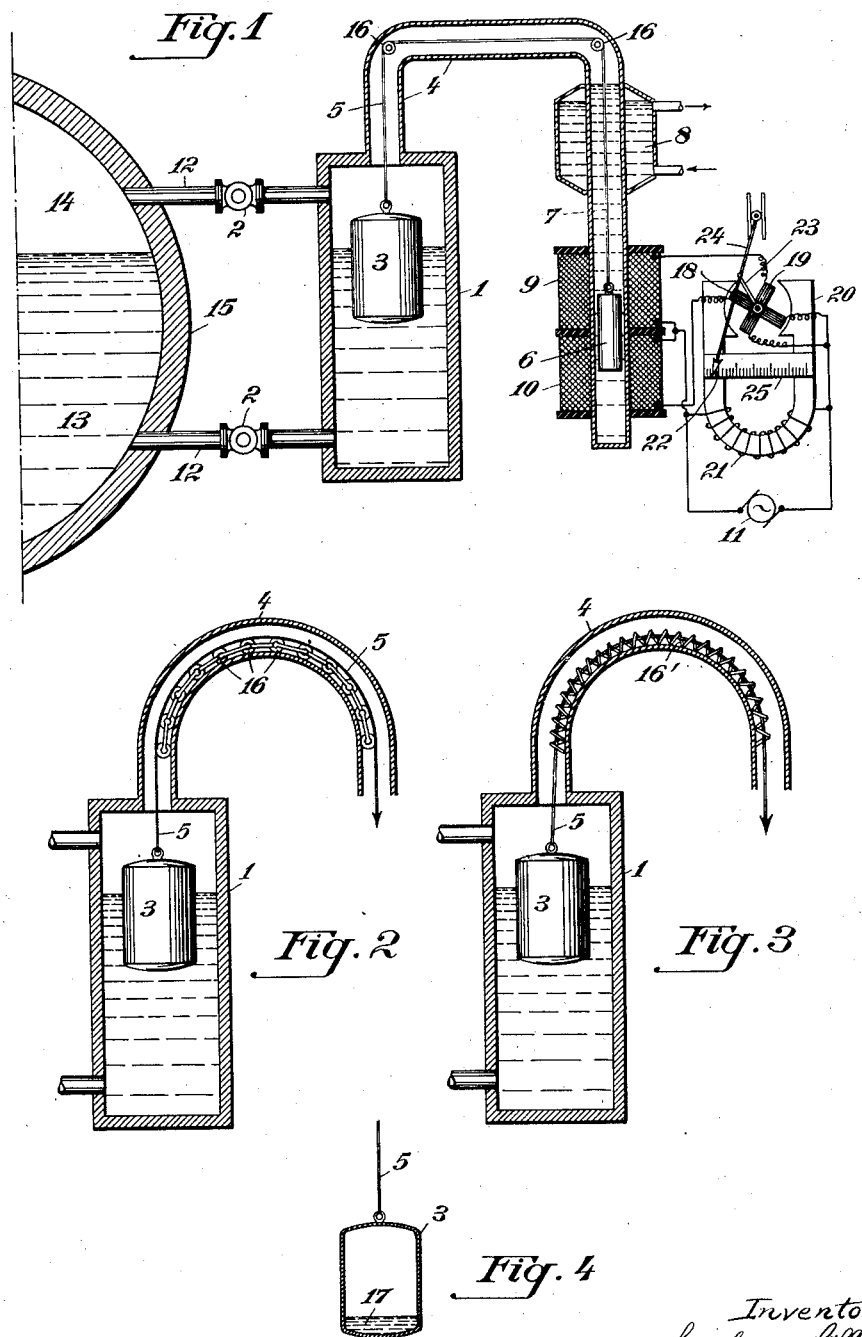

Patented Feb. 7, 1928.

1,658,449

UNITED STATES PATENT OFFICE.

STEPHAN LÖFFLER, OF BERLIN-CHARLOTTENBURG, GERMANY.

FLUID-LEVEL INDICATOR FOR HIGH-PRESSURE VESSELS OR CONTAINERS.

Application filed July 10, 1925, Serial No. 42,657, and in Germany July 18, 1924.

The present invention relates to improvements in fluid-level indicators for high-pressure vessels or containers.

As the tendency in modern steam engineering practice is towards the use of boilers having exceptional high steam pressures, one of the very difficult problems in connection with such boilers has been the devising of liquid level indicators capable of withstanding such high pressures as well as the high temperatures existing at such high pressures. The level indicators heretofore employed for steam boilers having low pressures (20 to 30 atmospheres or less) are usually provided with glass tubes or other transparent devices through which the level of the liquid is directly visible. It is not possible, however, to employ such indicators having glass tubes or plates with exceptional high pressures of from 50 to 100 atmospheres for example. Consequently it has been proposed to employ electric indicating devices, the latter also having been used in connection with various level indicating devices or systems. The use of electrical indicating devices in high pressure boilers also presents difficulties particularly from the standpoint of protecting or insulating the various parts against the very high temperatures.

The present invention has for its object to provide a novel fluid-level indicator, which is especially suited for use in connection with high-pressure steam-boilers.

In the accompanying drawings Fig. 1 shows, by way of example, a level indicating device constructed in accordance with the principles of this invention and applied to a steam boiler.

Fig. 2 shows a modified constructional form of some of the essential parts of the device.

Fig. 3 shows still another modification of the same essential parts.

Fig. 4 is a cross sectional detail of the floating element used in the device.

As shown in the drawings, numeral 1 indicates a float chamber or receptacle which is connected with the liquid space 13 and the steam space 14 of a steam boiler 15 by means of the tubes 12, the latter being provided with shut-off valves 2. The upper end of the float chamber 1 is in communication with one branch of a tube 4 having a general configuration of an inverted U. The U-tube is so arranged that its other branch is more remote from the boiler than the float chamber 1 so as to remove this branch and the parts associated with it from the zone of the high temperature heat existing closely adjacent to the boiler 15. Mounted within the float chamber 1 is a float 3, which, as shown in Fig. 4, is hollow and is partly filled with a liquid 17 for a purpose which will be hereinafter more fully set forth. The remote branch of the tube 4 is closed at its lower end and has mounted therein a counterweight 6 connected by means of a wire 5 with the float 3. The wire 5 being led over any suitable guiding means such as idler rolls 16 located in the curved or arched section of the U-tube. The counterweight 6 is in the form of an iron core and moves in a fluid 7 which may, for example, be condensed steam from the float chamber 1 kept at a low temperature by means of a cooling device 8 which surrounds the upper part of the branch of the tube 4 in which the counterweight is located.

The counterweight or core 6 acts inductively upon an electrical indicating device which indicates the water level in the boiler according to the position of the float 3 in the float chamber.

On the pressure tube 4, which is of a non-magnetic material, two coils 9 and 10 are fastened on the part of the tube in which the body 6 is located. These coils receive alternating current from a source of current 11. When the water-level in the boiler 1 rises or sinks and consequently the vertical position of the float 3 is altered the iron body 6 will alter its vertical position correspondingly. Thereby the self-induction in the current carrying coils will alter in such a manner that the self-induction of one of the coils will increase, when the self-induction of the other coil decreases. These variations are transmitted by suitable connecting wires to two crossed dynamometer coils 18, 19 in a measuring instrument. The coils 18, 19 are connected with the field of an electromagnet 20, which is energized by means of a coil 21 from the source of alternating current 11. The pointer 22 of the measuring instrument is guided in a rectilinear path by means of the guides 23, 24 and moves across a scale 25. It will be understood that every change in the self-induction of the two coils 9, 10 will effect a deflection of the said pointer and it will also be easily understood that the graduation of the scale and the other parts of the device may be arranged in such a manner that the fluctuations of the water level in the boiler may be read directly from the said pointer and scale.

According to Fig. 2 the guiding means 16 for the wire connecting the float and the counterweight consists of a chain of rollers arranged inside of the tube 4. Thereby the frictional resistance of the guide is reduced considerably.

Fig. 3 shows another form of guide for the wire 5 consisting of a spiral spring 16' by which the wire is surrounded in the manner of a Bowden mechanism.

As the float chamber 1 is directly connected with the boiler 15 by means of the pipes 12, the pressure existing within such float chamber will be substantially equal to that existing within the boiler. In order that a float having thin walls may be used within the float chamber I prefer, as shown in Fig. 4, to provide a small quantity of water 17 within the float 3, the float, as will be readily understood, being hermetically sealed after the water is placed therein. By means of this expedient the advantage is secured that as the high temperatures and pressures are reached in the float chamber the water 17 will be evaporated and the pressure of the steam generated from the water 17 will counteract the pressure exerted on the outer walls of the float.

What I claim as my invention and desire to secure by Letters Patent, is:

1. A level indicator for high pressure vessels especially steam boilers comprising a float chamber connected with the vessel in which the liquid level is to be indicated, an inverted U-shaped tube having one branch thereof connected to the upper part of said chamber and in communication therewith, the other branch of said tube being closed at its lower end, a float in said chamber, an iron core or counterweight for said float arranged in the closed branch of said U-tube, connections between said counterweight and float to cause them to move in unison, an electric measuring instrument and inductive means operatively associated with said instrument and counterweight.

2. A level indicator for high pressure vessels especially steam boilers comprising a float chamber connected with the vessel in which the liquid level is to be indicated, an inverted U-shaped tube having one branch thereof connected to the upper part of said chamber and in communication therewith, the other branch of said tube being closed at its lower end, a float in said chamber, an iron core or counterweight for said float arranged in the closed branch of said U-tube, connections between said counterweight and float to cause them to move in unison, an electric measuring instrument, electric coils connected with said instrument and inductively associated with said counterweight, and cooling means surrounding the closed branch of said U-shaped tube located above said coils for keeping the closed branch of said U-tube at relatively a low temperature.

3. A level indicator for high pressure vessels especially steam boilers comprising a float chamber connected with the vessel in which the liquid level is to be indicated, an inverted U-shaped tube having one branch thereof connected to the upper part of said chamber and in communication therewith, the other branch of said tube being closed at its lower end, a float in said chamber, an iron core or counterweight for said float arranged in the closed branch of said U-tube, connections between said counterweight and float to cause them to move in unison, an electric measuring instrument, a source of alternating current, a coil arranged on the closed branch of said U-shaped tube and connected with said measuring instrument and with said source of alternating current.

4. A level indicator for high pressure vessels especially steam boilers comprising a float chamber connected with the vessel in which liquid level is to be indicated, a hollow hermetically sealed float mounted within said chamber and containing a relatively small quantity of a liquid adapted to evaporate whereby increase of pressure and temperature conditions within said float chamber will cause said liquid to evaporate and produce a pressure within said float which will counteract the pressure existing within said float chamber and exerted on the outer walls of said float, a U-shaped tube having one branch thereof connected with said float chamber, the other branch of said tube being closed, a counterweight mounted within the closed branch of said tube and an electric measuring instrument, and inductive means operatively associated with said instrument and said counterweight.

5. A level indicator for high pressure vessels especially steam boilers comprising a float chamber connected with the vessel in which the liquid level is to be indicated, an inverted U-shaped tube having one branch thereof connected to the upper part of said chamber and in communication therewith, the other branch of said tube being closed at its lower end, a float in said chamber, an iron core or counterweight for said float arranged in the closed branch of said U-tube, connections between said counterweight and float to cause them to move in unison, a cooling device interposed between that portion of the U-tube in which said counterweight is mounted and the connection of said U-tube to said float chamber for condensing steam which passes from said float chamber to said U-tube thereby to maintain the closed branch of said U-tube at a lower temperature than said float chamber, an electric measuring instrument, and inductive means associated with said counterweight and said instrument.

6. A level indicator for high pressure vessels especially steam boilers comprising a float chamber connected with the vessel in which the liquid level is to be indicated, an inverted U-shaped tube having one branch thereof connected to the upper part of said chamber and in communication therewith, the other branch of said tube being closed at its lower end, a float in said chamber, an iron core or counterweight for said float arranged in the closed branch of said U-tube, connections between said counterweight and float to cause them to move in unison, an induction coil surrounding the closed branch of said U-tube adjacent to the lower end thereof, a cooling device surrounding said U-tube and interposed between said induction coil and the connection of said U-tube to said float chamber thereby to condense steam passing through said U-tube from said float chamber and to maintain such U-tube in the region of said induction coil at a temperature sufficiently low to prevent destructive heat transference from said U-tube to said coil, and an electric measuring instrument connected with said coil.

In testimony whereof I affix my signature.

STEPHAN LÖFFLER.